(12) United States Patent
Van Dun et al.

(10) Patent No.: US 11,667,819 B2
(45) Date of Patent: Jun. 6, 2023

(54) ETHYLENE/C3-C6 ALPHA-OLEFIN INTERPOLYMERS WITH IMPROVED PELLET FLOWABILITY

(71) Applicant: Dow Global Technologies LLC, Midland, MI (US)

(72) Inventors: Jozef J. I. Van Dun, Horgen (CH); Yi Jin, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 203 days.

(21) Appl. No.: 17/149,202

(22) Filed: Jan. 14, 2021

(65) Prior Publication Data

US 2021/0155832 A1 May 27, 2021

Related U.S. Application Data

(63) Continuation of application No. 16/329,636, filed as application No. PCT/US2017/048586 on Aug. 25, 2017, now abandoned.

(51) Int. Cl.
| | | |
|---|---|---|
| *C09J 123/16* | (2006.01) | |
| *C08F 210/16* | (2006.01) | |
| *C09J 11/06* | (2006.01) | |
| *C08F 4/659* | (2006.01) | |

(52) U.S. Cl.
CPC ........... *C09J 123/16* (2013.01); *C08F 210/16* (2013.01); *C09J 11/06* (2013.01); *C08F 4/65908* (2013.01); *C08F 4/65912* (2013.01); *C08F 2800/20* (2013.01); *Y02P 20/582* (2015.11)

(58) Field of Classification Search
CPC ...... C09J 123/16; C09J 11/06; C08F 4/65912; C08F 210/16
USPC ........................................................ 524/579
See application file for complete search history.

(56) References Cited

U.S. PATENT DOCUMENTS

| | | |
|---|---|---|
| 3,645,992 A | 2/1972 | Elston |
| 4,076,698 A | 2/1978 | Anderson et al. |
| 5,272,236 A | 12/1993 | Lai et al. |
| 5,278,272 A | 1/1994 | Lai et al. |
| 6,054,544 A | 4/2000 | Finlayson et al. |
| 6,335,410 B1 | 1/2002 | Finlayson et al. |
| 6,723,810 B2 | 4/2004 | Finlayson et al. |
| 6,914,112 B2 | 7/2005 | Mori et al. |
| 8,536,268 B2 | 9/2013 | Karjala et al. |
| 2006/0166812 A1* | 7/2006 | Braganca ............... B01J 31/143 502/103 |
| 2013/0085246 A1 | 4/2013 | Kum et al. |
| 2016/0108157 A1* | 4/2016 | Cerk ......................... C08F 2/06 526/348.2 |

FOREIGN PATENT DOCUMENTS

EP      1148115      10/2001

OTHER PUBLICATIONS

PCT/US2016/049458, International Preliminary Report on Patentability dated Mar. 5, 2019.
PCT/US2016/049458, International Search Report and Written Opinion dated Jan. 30, 2017.
PCT/US2017/048586, International Preliminary Report on Patentability dated Mar. 5, 2019.
PCT/US2017/048586, International Search Report and Written Opinion dated Oct. 19, 2017.

* cited by examiner

*Primary Examiner* — Hui H Chin

(57) ABSTRACT

A composition is provided, which comprises an ethylene/C3-C6 alpha-olefin interpolymer, and wherein the interpolymer comprises the following properties:
    a) an HCC value that meets the following equation:

$$HCC(\text{wt \%}) \geq -648.6[(\text{wt \%})(cc)/(g)] \times (\text{density}) + 569.4 (\text{wt \%});$$

b) an aged flowability ≥130 g/sec.

8 Claims, 3 Drawing Sheets

ETHYLENE/C3-C6 ALPHA-OLEFIN INTERPOLYMERS WITH IMPROVED PELLET FLOWABILITY

REFERENCE TO RELATED APPLICATIONS

The present application is a continuation of U.S. application Ser. No. 16/329,636, filed on Feb. 28, 2019, which is a 35 U.S.C. of § 371 of International Application No. PCT/US2017/048586, filed on Aug. 25, 2017, which claims priority to International Application No. PCT/US16/049458, filed Aug. 30, 2016.

BACKGROUND

Low molecular weight ethylene/alpha-olefin interpolymers often exhibit stickiness during the flow of pellets formed from such interpolymers. There is a need for ethylene/C3-C6 alpha-olefin interpolymers that have reduced blocking (sticking) characteristics, and which can be used in adhesive formulations. These needs have been met by the following invention.

SUMMARY OF THE INVENTION

A composition is provided that comprises an ethylene/C3-C6 alpha-olefin interpolymer, and wherein the interpolymer comprises the following properties:

a) an HCC value that meets the following equation:

$$HCC(\text{wt \%}) \geq -648.6[(\text{wt \%})(cc)/(g)] \times (\text{density}) + 569.4 \text{ (wt \%)};$$

b) an aged flowability ≥130 g/sec.

DETAILED DESCRIPTION

Figure 1:
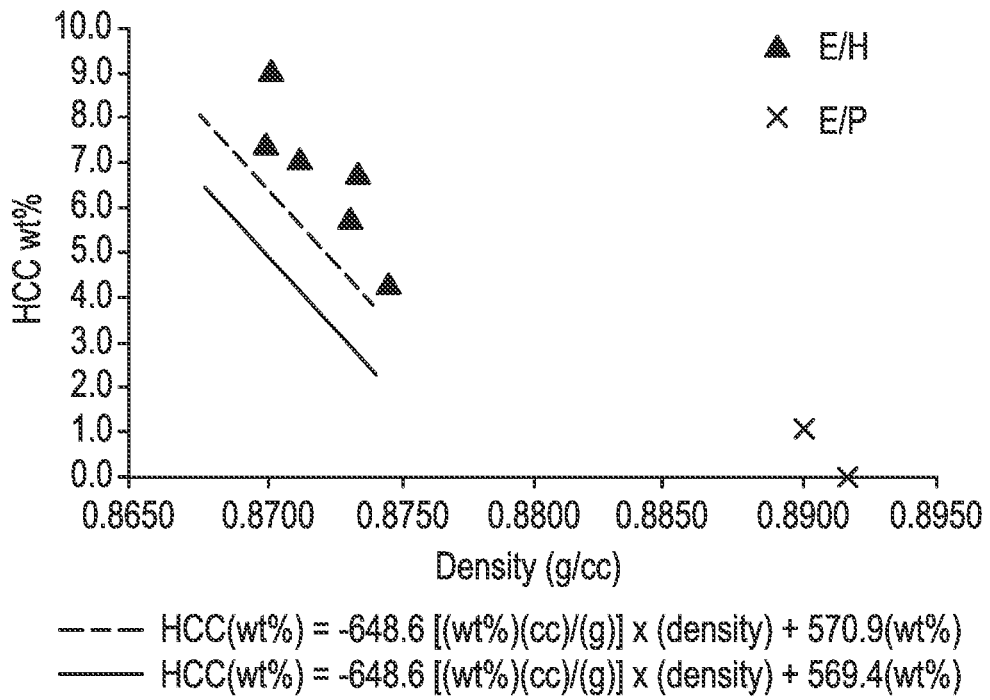
FIG. 1 depicts an "HCC versus density" plot for several inventive ethylene/C3-C6 alpha-olefin interpolymers.

As discussed above, a composition is provided that comprises an ethylene/C3-C6 alpha-olefin interpolymer, and wherein the interpolymer comprises the following properties:

a) an HCC value that meets the following equation:

$$HCC(\text{wt \%}) \geq -648.6[(\text{wt \%})(cc)/(g)] \times (\text{density}) + 569.4 \text{ (wt \%)};$$

b) an aged flowability ≥130 g/sec.

A provided composition may comprise a combination of two or more embodiments as described herein.

In one embodiment, the composition is in pellet form.

In one embodiment, HCC Method 2 is used for the determination of the HCC value.

In one embodiment, the ethylene/C3-C6alpha-olefin interpolymer has an HCC value that meets the following equation: HCC (wt %)≥−648.6 [(wt %)(cc)/(g)]×(density)+570.9 (wt %). In a further embodiment, the alpha-olefin is a C3 or C6 alpha-olefin. In one embodiment, HCC Method 2 is used for the determination of the HCC value.

In one embodiment, the ethylene/C3-C6alpha-olefin interpolymer further comprises an HCC value that meets the following equation: HCC (wt %)<−463.4 [(wt %)(cc)/(g)]×(density)+413.8 (wt %). In a further embodiment, the alpha-olefin is a C3 or C6 alpha-olefin. In one embodiment, HCC Method 2 is used for the determination of the HCC value.

In one embodiment, the ethylene/C3-C6alpha-olefin interpolymer has an HCC value ≥0 wt %, or ≥1.0 wt %, or ≥4.0 wt %, or ≥4.2 wt %, or ≥4.5 wt %, or ≥5.0 wt %, or ≥5.5 wt %, or ≥6.0 wt %. In a further embodiment, the alpha-olefin is a C3 or C6 alpha-olefin. In one embodiment, HCC Method 2 is used for the determination of the HCC value.

In one embodiment, the ethylene/C3-C6alpha-olefin interpolymer has an HCC value ≤12.0 wt %, or ≤11.5 wt %, or ≤11.0 wt %, or ≤10.5 wt %, or ≤10.0 wt %, or ≤9.5 wt %, or ≤9.0 wt %. In a further embodiment, the alpha-olefin is a C3 or C6 alpha-olefin. In one embodiment, HCC Method 2 is used for the determination of the HCC value.

In one embodiment, the ethylene/C3-C6alpha-olefin interpolymer has an HCC value ≥4.0 wt %, or ≥4.2 wt %, or ≥4.5 wt %, or ≥5.0 wt %, or ≥5.5 wt %, or ≥6.0 wt %. In a further embodiment, the interpolymer is an ethylene/C6 alpha-olefin copolymer. In one embodiment, HCC Method 2 is used for the determination of the HCC value. In one embodiment, the ethylene/alpha-olefin interpolymer has an HCC value ≤11.0 wt %, or ≤10.5 wt %, or ≤10.0 wt %, or ≤9.5 wt %, or ≤9.0 wt %. In a further embodiment, the interpolymer is an ethylene/C6 alpha-olefin copolymer. In one embodiment, HCC Method 2 is used for the determination of the HCC value.

In one embodiment, the ethylene/C3-C6alpha-olefin interpolymer has an HCC value ≥0 wt %, or ≥0.5 wt %, or ≥1.0 wt %. In a further embodiment, the interpolymer is an ethylene/C3 alpha-olefin interpolymer, or copolymer. In one embodiment, HCC Method 2 is used for the determination of the HCC value. In one embodiment, the ethylene/alpha-olefin interpolymer has an HCC value ≤5.0 wt %, or ≤4.5 wt %, or ≤4.0 wt %, or ≤3.5 wt %, or ≤3.0 wt %. In a further embodiment, the interpolymer is an ethylene/C3 alpha-olefin interpolymer, or copolymer. In one embodiment, HCC Method 2 is used for the determination of the HCC value.

The HCC (or "High Comonomer Content") value is a compositional feature of the polymer formed during the polymerization, and is not a residual impurity. The HCC value indicates the amount of a low-density, low molecular weight, oligomeric fraction in the polymer sample. The HCC value does not represent an average comonomer content in the entire polymer sample. See the test methods below to determine HCC value. The entire polymer sample, and not solvent extracted portions, is analyzed for the HCC value. The chromatography test methods are used to measure the comonomer distribution in the polymer sample, and not used to measure impurities in the polymer sample. The "comonomer distribution" is a microstructure parameter of the polymer, and not an impurity. In one embodiment, HCC Method 2 is used for the determination of the HCC value.

In one embodiment, the ethylene/C3-C6alpha-olefin interpolymer has an aged flowability ≥135.0 g/sec, or ≥140.0 g/sec, or ≥145.0 g/sec, or ≥150.0 g/sec, or ≥155.0 g/sec. In a further embodiment, the alpha-olefin is a C3 or C6 alpha-olefin. The aged flowability is determined by the method described herein. In one embodiment, the composition is in pellet form.

In one embodiment, the ethylene/C3-C6alpha-olefin interpolymer has an aged flowability ≤400.0 g/sec, or ≤350.0 g/sec, or ≤300.0 g/sec. In a further embodiment, the alpha-olefin is a C3 or C6 alpha-olefin. The aged flowability is determined by the method described herein. In one embodiment, the composition is in pellet form.

In one embodiment, the ethylene/C3-C6alpha-olefin interpolymer has an aged flowability ≥135.0 g/sec, or ≥140.0 g/sec, or ≥145.0 g/sec. In a further embodiment, the interpolymer is an ethylene/C6 alpha-olefin copolymer. In one embodiment, the ethylene/C3-C6alpha-olefin interpolymer has an aged flowability ≤500.0 g/sec, or ≤400.0 g/sec, or ≤300.0 g/sec. In a further embodiment, the interpolymer is an ethylene/C6 alpha-olefin copolymer. The aged flowability is determined by the method described herein. In one embodiment, the composition is in pellet form.

In one embodiment, the ethylene/C3-C6alpha-olefin interpolymer has an aged flowability ≥140.0 g/sec, or ≥150.0 g/sec, or ≥160.0 g/sec. In a further embodiment, the interpolymer is an ethylene/C3 alpha-olefin interpolymer, or copolymer. In one embodiment, the ethylene/C3-C6alpha-olefin interpolymer has an aged flowability ≤450.0 g/sec, or ≤400.0 g/sec, or ≤350.0 g/sec. In a further embodiment, the interpolymer is an ethylene/C3 alpha-olefin interpolymer, or copolymer. The aged flowability is determined by the method described herein. In one embodiment, the composition is in pellet form.

In one embodiment, the ethylene/C3-C6 alpha-olefin interpolymer has a melt viscosity ≤50,000 cP, or ≤45,000 cP, or ≤40,000 cP, or ≤35,000 cP, or ≤30,000 cP, or ≤25,000 cP, or ≤20,000 cP, at 350° F. (177° C.). In a further embodiment, the alpha-olefin is a C3 or C6 alpha-olefin. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6 alpha-olefin interpolymer has a melt viscosity ≥2,000 cP, or ≥2,500 cP, or ≥3,000 cP, or ≥3,500 cP, or ≥4,000 cP, or ≥4,500 cP, or ≥5,000 cP, or ≥5,500 cP, or ≥6,000 cP at 350° F. (177° C.). In a further embodiment, the alpha-olefin is a C3 or C6 alpha-olefin. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6 alpha-olefin interpolymer has a melt viscosity from 2,000 cP to 50,000 cP, or from 2,500 cP to 45,000, or from 3,000 cP to 40,000, or from 3,500 cP to 35,000, or from 4,000 cP to 30,000, or from 4,500 cP to 25,000, or from 5,000 cP to 20,000 at 350° F. (177° C.). In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a density ≥0.855 g/cc, or ≥0.860 g/cc, or ≥0.865 g/cc, or ≥0.870 g/cc (1 cc=1 cm$^3$). In a further embodiment, the alpha-olefin is a C3 or C6 alpha-olefin.

In one embodiment, the ethylene/C3-C6alpha-olefin interpolymer has a density <0.910 g/cc, or ≤0.905, or ≤0.900 g/cc, or ≤0.895 g/cc. In a further embodiment, the alpha-olefin is a C3 or C6 alpha-olefin.

In one embodiment, the ethylene/C3-C6alpha-olefin interpolymer has a density from 0.855 to 0.900 g/cc, or from 0.860 to 0.895 g/cc, or from 0.865 to 0.890 g/cc, or from 0.870 to 0.885 g/cc. In a further embodiment, the interpolymer is an ethylene/C6 alpha-olefin copolymer.

In one embodiment, the ethylene/C3-C6alpha-olefin interpolymer has a density from 0.875 to 0.910 g/cc, or from 0.880 to 0.905 g/cc, or from 0.885 to 0.900 g/cc, or from 0.890 to 0.895 g/cc. In a further embodiment, the interpolymer is an ethylene/C3 alpha-olefin interpolymer, or copolymer.

In one embodiment, the ethylene/C3-C6alpha-olefin interpolymer has a highest peak melting temperature ≤85.0° C., or ≤82.0° C., or ≤80.0° C. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a highest peak melting temperature ≥60.0° C., or ≥62.0° C., or ≥64.0° C. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a highest peak melting temperature ≤80.0° C., or ≤78.0° C., or ≤76.0° C. In a further embodiment, the interpolymer is an ethylene/C6 alpha-olefin copolymer. In one embodiment, the ethylene/alpha-olefin interpolymer has a highest peak melting temperature ≥60.0° C., or ≥62.0° C., or ≥64.0° C. In a further embodiment, the interpolymer is an ethylene/C6 alpha-olefin copolymer.

In one embodiment, the ethylene/C3-C6alpha-olefin interpolymer has a melting temperature ≤84.0° C., or ≤82.0° C., or ≤80.0° C. In a further embodiment, the interpolymer is an ethylene/C3 alpha-olefin interpolymer. In one embodiment, the ethylene/alpha-olefin interpolymer has a melting temperature ≥72.0° C., or ≥74.0° C., or ≥76.0° C. In a further embodiment, the interpolymer is an ethylene/C3 alpha-olefin interpolymer, or copolymer.

In one embodiment, the ethylene/C3-C6alpha-olefin interpolymer has a crystallization temperature ($T_c$) ≤72.0° C., or ≤70.0° C., or ≤68.0° C. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a crystallization temperature ($T_c$) ≥48.0° C., or ≥50.0° C., or ≥52.0° C. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a crystallization temperature ($T_c$) ≤70.0° C., or ≤68.0° C., or ≤66.0° C. In a further embodiment, the interpolymer is an ethylene/C6 alpha-olefin copolymer. In one embodiment, the ethylene/alpha-olefin interpolymer has a crystallization temperature ($T_a$) ≥48.0° C., or ≥50.0° C., or ≥52.0° C. In a further embodiment, the interpolymer is an ethylene/C6 alpha-olefin copolymer.

In one embodiment, the ethylene/C3-C6alpha-olefin interpolymer has a crystallization temperature ($T_a$) ≤72.0° C., or ≤70.0° C., or ≤68.0° C. In a further embodiment, the interpolymer is an ethylene/C3 alpha-olefin interpolymer, or copolymer. In one embodiment, the ethylene/alpha-olefin interpolymer has a crystallization temperature ($T_a$) ≥58.0°

C., or ≥60.0° C., or ≥62.0° C. In a further embodiment, the interpolymer is an ethylene/C3 alpha-olefin interpolymer, or copolymer.

In one embodiment, the ethylene/C3-C6alpha-olefin interpolymer has a $T_m$ and $T_c$ that meets the following relationship: $(T_m-T_c)$ is from 5° C. to 25° C., further from 8° C. to 20° C., further 10° C. to 15° C. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a percent crystallinity ≤50 percent, or ≤45 percent, or ≤40 percent, or ≤35 percent, or ≤30 percent, as determined by DSC. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a percent crystallinity ≥8 percent, or ≥10 percent, or ≥12 percent, or ≥15 percent, or ≥17 percent, as determined by DSC. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a percent crystallinity ≤35 percent, or ≤30 percent, or ≤25 percent. In a further embodiment, the interpolymer is an ethylene/C6 alpha-olefin copolymer. In one embodiment, the ethylene/alpha-olefin interpolymer has a percent crystallinity ≥12 percent, or ≥14 percent, or ≥16 percent. In a further embodiment, the interpolymer is an ethylene/C6 alpha-olefin copolymer.

In one embodiment, the ethylene/C3-C6alpha-olefin interpolymer has a percent crystallinity ≤40 percent, or ≤35 percent, or ≤30 percent. In a further embodiment, the interpolymer is an ethylene/C3 alpha-olefin interpolymer. In one embodiment, the ethylene/alpha-olefin interpolymer has a percent crystallinity ≥20 percent, or ≥22 percent, or ≥24 percent. In a further embodiment, the interpolymer is an ethylene/C3 alpha-olefin interpolymer, or copolymer.

In one embodiment, the ethylene/C3-C6alpha-olefin interpolymer has a molecular weight distribution (Mw/Mn) ≥1.8, or ≥2.0, or ≥2.1, or ≥2.2. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a molecular weight distribution (Mw/Mn) ≤3.5, or ≤3.2, or ≤3.0, or ≤2.9, or ≤2.8, or ≤2.7, or ≤2.6. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a molecular weight distribution (Mw/Mn) ≥2.0, or ≥2.1, or ≥2.2. In a further embodiment, the interpolymer is an ethylene/C6 alpha-olefin copolymer. In one embodiment, the ethylene/alpha-olefin interpolymer has a molecular weight distribution (Mw/Mn) ≤3.0, or ≤2.8, or ≤2.6. In a further embodiment, the interpolymer is an ethylene/C6 alpha-olefin copolymer.

In one embodiment, the ethylene/C3-C6alpha-olefin interpolymer has a molecular weight distribution (Mw/Mn) ≥2.0, or ≥2.1, or ≥2.2. In a further embodiment, the interpolymer is an ethylene/C3 alpha-olefin interpolymer, or copolymer. In one embodiment, the ethylene/alpha-olefin interpolymer has a molecular weight distribution (Mw/Mn) ≤3.0, or ≤2.8, or ≤2.5. In a further embodiment, the interpolymer is an ethylene/C3 alpha-olefin interpolymer, or copolymer.

In one embodiment, the ethylene/C3-C6alpha-olefin interpolymer has a weight average molecular weight (Mw)≤40,000 g/mole, or ≤35,000 g/mole, or ≤30,000 g/mole, or ≤25,000 g/mole. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a weight average molecular weight (Mw) ≥10,000 g/mole, or ≥12,000 g/mole, or ≥15,000 g/mole. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a number average molecular weight (Mn) ≤20,000 g/mole, or ≤18,000 g/mole, or ≤16,000 g/mole, or ≤14,000 g/mole, or ≤12,000 g/mole, or ≤10,000 g/mole. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6alpha-olefin interpolymer has a number average molecular weight (Mn) ≥4,500 g/mole, or ≥5,000 g/mole, or ≥5,500 g/mole, or ≥6,000 g/mole, or ≥6,500 g/mole, or ≥7,000 g/mole. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In regard to the ethylene/C3-C6alpha-olefin interpolymer, preferred α-olefins include propylene, 1-butene, 1-pentene, and 1-hexene, and further propylene, 1-butene, and 1-hexene, and further propylene and hexene.

In one embodiment, the alpha-olefin is a C6 alpha-olefin or a C3 alpha-olefin.

In one embodiment, the ethylene/C3-C6 alpha-olefin interpolymer comprises, in polymerized form, from 12 to 40 wt %, or from 14 to 38 wt %, or from 16 to 36 wt %, or from 18 to 34 wt %, of the C3-C6 alpha-olefin, based on the weight of the interpolymer. In a further embodiment, the alpha-olefin is a C3 or C6 alpha-olefin. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6 α-olefin interpolymer, is an ethylene/C3-C6 α-olefin copolymer. Preferred α-olefins are described above.

In one embodiment, the ethylene/C3-C6 alpha-olefin interpolymer has a melt index (I2 or MI), or calculated melt index (I2 or MI), greater than, or equal to, 400 g/10 min, further greater than, or equal to, 600 g/10 min, and more further greater than, or equal to, 800 g/10 min. In a further embodiment, the ethylene/C3-C6 alpha-olefin interpolymer is an ethylene/C3-C6 alpha-olefin copolymer. Preferred α-olefins are described above. In a further embodiment, the interpolymer is an ethylene/C6 alpha-olefin copolymer. In another embodiment, the interpolymer is an ethylene/C3 alpha-olefin interpolymer, or copolymer.

In one embodiment, the ethylene/C3-C6 alpha-olefin interpolymer has a melt index (I2 or MI), or calculated melt index (I2 or MI), less than, or equal to, 2000 g/10 min, further less than, or equal to, 1500 g/10 min, and further less than, or equal to, 1200 g/10 min. In a further embodiment, the ethylene/C3-C6 alpha-olefin interpolymer is an ethylene/C3-C6 alpha-olefin copolymer. Preferred α-olefins are described above. In a further embodiment, the interpolymer is an ethylene/C6 alpha-olefin copolymer. In another embodiment, the interpolymer is an ethylene/C3 alpha-olefin interpolymer, or copolymer.

In one embodiment, the composition further comprises at least one tackifier and at least one oil.

In one embodiment, the composition comprises from 10 to 50 wt %, or from 15 to 45 wt %, or from 20 to 40 wt % of a tackifier, based on the weight of the composition.

In one embodiment, the composition comprises from 10 to 45 wt %, or from 15 to 40 wt %, or from 20 to 30 wt % of an oil, based on the weight of the composition.

The ethylene/C3-C6 alpha-olefin interpolymer may comprise a combination of two or more embodiments as described herein. The ethylene/C3-C6 alpha-olefin copolymer may comprise a combination of two or more embodiments as described herein. A composition may comprise a combination of two or more embodiments described herein.

Also is provided an article comprising at least one component formed from an inventive composition.

In one embodiment, the article further comprises a substrate. In a further embodiment, the substrate is selected from the group consisting of the following: coated substrates, substrates made from recycled paper, and combinations thereof. An article may comprise a combination of two or more embodiments as described herein.

In one embodiment, the ethylene/C3-C6alpha-olefin interpolymer is polymerized in at least one reactor is selected from the following: a recirculated loop reactor, a continuous stirred-tank reactor, a plug-flow reactor, or a combination thereof.

In one embodiment, the ethylene/C3-C6alpha-olefin interpolymer is polymerized in the presence of a catalyst is selected from a metal (e.g., hafnium, zirconium, or titanium) complex of a polyvalent aryloxyether.

Ethylene/C3-C6 Alpha-Olefin Interpolymers

In one embodiment, the ethylene/C3-C6 α-olefin interpolymer is a homogeneously branched linear interpolymer, and further a copolymer, or a homogeneous branched substantially linear interpolymer, and further a copolymer.

In one embodiment, the ethylene/C3-C6 α-olefin interpolymer is a homogeneously branched linear interpolymer, and further a copolymer.

In one embodiment, the ethylene/C3-C6 α-olefin interpolymer is a homogeneous branched substantially linear interpolymer, and further a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 total carbons" to "3 long chain branches per 1000 total carbons." The length of a long chain branch is longer than the carbon length of a short chain branch, formed from the incorporation of one comonomer into the polymer backbone.

Some polymers may be substituted with "0.01 long chain branches per 1000 total carbons to 3 long chain branch per 1000 total carbons," further from "0.01 long chain branches per 1000 total carbons to 2 long chain branch per 1000 total carbons," and further from "0.01 long chain branches per 1000 total carbons to 1 long chain branch per 1000 total carbons."

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra-low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers, and ethylene vinyl acetate (EVA) copolymers.

The homogeneously branched, substantially linear ethylene/α-olefin interpolymers useful herein have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The ethylene/C3-C6 α-olefin interpolymer may comprise a combination of two or more embodiments as described herein. The ethylene/C3-C6 α-olefin copolymer may comprise a combination of two or more embodiments as described herein.

Additives and Applications

Typically the polymers and resins are treated with one or more stabilizers, for example, antioxidants, such as IRGANOX 1010, IRGANOX 1076, and IRGAFOS 168, now supplied by BASF. Polymers are typically treated with one or more stabilizers before an extrusion or other melt processes. Other polymeric additives include, but are not limited to, ultraviolet light absorbers, antistatic agents, pigments and dyes, nucleating agents, fillers, slip agents, fire retardants, plasticizers, processing aids, lubricants, stabilizers, smoke inhibitors, viscosity control agents and anti-blocking agents. The inventive compositions may also contain one or more thermoplastic polymers.

The inventive compositions may also be used in a variety of application, including, but not limited to, adhesives, automotive applications, graphic arts, nonwovens, panel assembly, high performance tapes, contact hot melt adhesives, paperboard coatings, inks, personal care and cosmetic products, sealants, color and additive concentrates, carpet-tape adhesives, woodworking adhesives, and profile wrap adhesives.

The inventive compositions may further comprise a tackifier. Exemplary tackifying resins include, but are not limited to, aliphatic, cycloaliphatic and aromatic hydrocarbons, and modified hydrocarbons and hydrogenated versions; terpenes and modified terpenes and hydrogenated versions; and rosins and rosin derivatives and hydrogenated versions; and mixtures thereof. Suitable tackifiers include, but are not limited to, EASTOTAC H100 and EASTOTAC H115, each available from Eastman Chemical. In one embodiment, the composition comprises from 10 to 60 weight percent, further from 20 to 50 weight percent, and further from 30 to 40 weight percent of the tackifier, based on the weight of the composition. In a further embodiment, the tackifier is a hydrocarbon, and further a hydrogenated hydrocarbon.

The inventive compositions may further comprise a wax. Waxes include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes and fatty amide waxes. It is common in the art to use the terminology "synthetic high melting point waxes" to include high density, low molecular weight polyethylene waxes, by-product polyethylene waxes and Fischer-Tropsch waxes. Other waxes also include those described in U.S. Pat. Nos. 6,335,410; 6,054,544 and 6,723,810; which are all incorporated herein by reference. Preferred waxes include, but are not limited to, SASOL waxes (e.g., SASOLWAX H1 from Sasol Wax Company), and Fischer-Tropsch waxes.

In one embodiment, the composition comprises from 10 to 60 weight percent, further from 15 to 50 weight percent, and further from 20 to 40 weight percent, and further from 25 to 30 weight percent of the wax, based on the weight of the composition.

The inventive compositions may further comprise an oil. Oils are typically employed to reduce the viscosity of the adhesive. When employed, an oil will be typically present in an amount less than 50, preferably less than 40, and more preferably less than 35 weight percent, based on the weight of the composition. An oil may present in an amount greater than, or equal to, 2 weight percent, further greater than, or equal to, 5 weight percent, and further greater than, or equal to, 10 weight percent, based on the weight of the composition. Exemplary classes of oils include, but are not limited to, white mineral oil (such as KAYDOL oil available from Witco), and SHELLFLEX 371 naphthenic oil (available from Shell Oil Company) and CALSOL 5550 (naphthenic oil from Calumet Lubricants).

DEFINITIONS

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, 50 wt % or a majority amount of olefin monomer, for example ethylene or propylene (based on the weight of the polymer), and optionally may comprise one or more comonomers.

The term, "propylene-based polymer," as used herein, refers to a polymer that comprises, in polymerized form, a majority amount of propylene monomer (based on the weight of the polymer), and optionally may comprise one or more comonomers.

The term, "ethylene-based polymer," as used herein, refers to a polymer that comprises, in polymerized form, ≥50 wt %, and preferably a majority amount of ethylene monomer (based on the weight of the polymer), and optionally may comprise one or more comonomers.

The term, "ethylene/α-olefin interpolymer," as used herein, refers to an interpolymer that comprises, in polymerized form, ≥50 wt %, and preferably a majority amount of ethylene monomer (based on the weight of the interpolymer), and at least one α-olefin.

The term, "ethylene/α-olefin copolymer," as used herein, refers to a copolymer that comprises, in polymerized form, ≥50 wt %, and preferably a majority amount of ethylene monomer (based on the weight of the copolymer), and an α-olefin, as the only two monomer types.

The term "pellet form," as used herein, typically refers to, in reference to a polymer, small particles of polymer formed from a pelletization process. This term also includes polymer particles formed by compressing, or adhering, a polymer powder into granular pellets. In one embodiment, the polymer particles are formed from a pelletization process.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not delineated or listed.

TEST METHODS

Melt Viscosity

Melt viscosity was measured in accordance with ASTM D 3236 (177° C., 350° F.), using a Brookfield Digital Viscometer (Model DV-III, version 3), and disposable aluminum sample chambers. The spindle was a SC-31 hot-melt spindle, suitable for measuring viscosities in the range from 10 to 100,000 centipoise. The sample was poured into the chamber, which was, in turn, inserted into a Brookfield Thermosel, and locked into place. The sample chamber had a notch on the bottom that fit the bottom of the Brookfield Thermosel, to ensure that the chamber was not allowed to turn, when the spindle was inserted and spinning. The sample (approximately 8-10 grams of resin) was heated to the required temperature, until the melted sample was about one inch below the top of the sample chamber. The viscometer apparatus was lowered, and the spindle submerged into the sample chamber. Lowering was continued, until the brackets on the viscometer aligned on the Thermosel. The viscometer was turned on, and set to operate at a shear rate, which led to a torque reading in the range of 40 to 60 percent of the total torque capacity, based on the rpm output of the viscometer. Readings were taken every minute for about 15 minutes, or until the values stabilized, at which point, a final reading was recorded.

Melt Index

Melt index (I2, or MI) of an ethylene-based polymer was measured in accordance with ASTM D-1238, condition 190° C./2.16 kg. For high I2 polymers (I2 greater than, or equal to, 200 g/mole, melt index was preferably calculated from Brookfield viscosity, as described in U.S. Pat. Nos. 6,335,410; 6,054,544; 6,723,810. I2(190° C./2.16 kg)=3.6126[10$^{(log(\eta)-6.6928)/-1.1363}$]−9.31851, where η=melt viscosity, in cP, at 350° F.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. About 5 mg to 8 mg of polymer sample is weighed and placed in a DSC pan, and the pan was crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for three minutes in order to remove its thermal history. Next, the sample was cooled to −80° C., at a 10° C./minute cooling rate, and held isothermal at −80° C. for three minutes. The sample was then heated to 180° C. (this is the "second heat" ramp) at a 10° C./minute heating rate. The cooling and second heating curves were recorded. The values determined are the peak melting temperature, Tm, and the peak crystallization temperature, Tc. The heat of fusion ($H_f$) (in Joules per gram), and the % crystallinity were determined using the using the Equation below (for polyethylene samples): % Crystallinity=(($H_f$)/292 J/g)×100.

The heat of fusion ($H_f$) and the peak melting temperature were reported from the second heat curve. Peak crystallization temperature was determined from the cooling curve.

Density—Density was measured in accordance with ASTM D-792. The density measured was a "quick density," meaning that the density was determined after one hour from the time of molding.

High Comonomer Content (HCC) Method 1

A commercial Crystallization Elution Fractionation instrument (CEF) (Polymer Char, Spain) was used to perform the high temperature thermal gradient interaction chromatography (TGIC) measurement (Cong, et al., Macromolecules, 2011, 44 (8), 3062-3072). A HYPERCARB column (100×4.6 mm, Part #35005-104646, Thermo Scientific) was use for separation. A "8 cm×0.48 cm (3/16 inch ID)" stainless steel column, packed with 27 micron glass bead (Catalog #GL01918/20-27 um, MO-SCI Specialty Products, LLC, Rolla, Mo., USA), was installed in front of IR detector, in the top oven of the CEF instrument. The experimental parameters were as follows: a top oven/transfer line/needle temperature at 150° C., a dissolution temperature at 160° C., a dissolution stirring setting at 2, a sample loading volume of 0.400 mL, a pump stabilization time of 15 seconds, a pump flow rate of cleaning column at 0.500 mL/m, a pump flow rate of column loading at 0.300 ml/min, a stabilization temperature at 150° C., a stabilization time (pre, prior to load to column) at 3.0 min, a stabilization time (post, after loaded to column) at 1.0 min, a SF (Soluble Fraction) time at 3.0 min, a cooling rate of 3.00° C./min from 150° C. to 30° C., a flow rate during cooling process of 0.00 ml/min, a heating rate of 2.00° C./min from 30° C. to 160° C., an isothermal time at 160° C. for 10 min, an elution flow rate of 0.500 mL/min, and an injection loop size of 140 microliters.

Samples were prepared by the PolymerChar autosampler at 160° C., for 60 minutes, at a concentration of 4.0 mg/ml in ortho-dichlorobenze (ODCB, 99% anhydrous grade, Sigma-Aldrich). Silica gel 40 (particle size 0.2~0.5 mm, catalogue number 10181-3, EMD) was dried in a vacuum oven at 160° C., for about two hours, prior to use. 2,5-Di-ter-butyl-4-methylphenol (1.6 grams, BHT, catalogue number B1378-500G, Sigma-Aldrich) and silica gel (5.0 grams) were added to two liters of ODCB. This "ODCB containing BHT and silica gel" is now referred to as "ODCB." This ODCB was sparged with dried nitrogen ($N_2$) for one hour prior to use.

The TGIC data was processed on a PolymerChar (Spain) "GPC One" software platform. The temperature calibration was performed with a mixture of about 4 to 6 mg EICOSANE, 14.0 mg of isotactic homopolymer polypropylene iPP (molecular weight Mw reported as polyethylene equivalent of 150,000 to 190,000 g/mole, and polydispersity (Mw/Mn) of 3.6 to 4.0), and 14.0 mg of homopolymer polyethylene HDPE (zero comonomer content, Mw reported as polyethylene equivalent as 115,000 to 125,000 g/mole, and polydispersity of 2.5 to 2.8), in a 10 mL vial filled with 7.0 mL of ODCB. The dissolution time was two hours at 160° C.

The calibration process (30° C. to 150° C. for EICOSANE elution and HDPE elution) consisted of the following steps:

Extrapolated the eluting temperature for each of the isothermal steps during elution according to heating rate.

Calculated the delay volume. Shifted the temperature (x-axis) corresponding to the IR measurement channel chromatogram (y-axis), so that the EICOSANE peak (y-axis) was coincident with elution temperature at 30.0° C. The delay volume was calculated from the temperature difference (30° C.—the actual elution temperature of EICOSANE peak) divided by heating rate of the method, and then multiplied by elution flow rate.

Adjusted each recorded elution temperature with this same delay volume adjustment.

Linearly scaled the heating rate, so that the HDPE reference had an elution peak temperature of 150.0° C., while maintaining an EICOSANE elution peak temperature of 30.0° C.

The peak temperature of the polypropylene was observed to be 119.3-120.2° C., which is a validation of the calibration method.

Data processing for polymer samples of TGIC is described below.

A solvent blank (pure solvent injection) was run at the same experimental conditions as the polymer samples. Data processing for polymer samples included the following: a) subtraction of the solvent blank for each detector channel, b) temperature extrapolation, as described in the calibration process, c) compensation of temperature with the delay volume, determined from the calibration process, and d) adjustment in elution temperature axis to the 30° C. and 160° C. range, as calculated from the heating rate of the calibration.

The chromatogram was integrated with PolymerChar "GPC One" software. A straight baseline was drawn from the visible difference, when the peak falls to a flat baseline (roughly a zero value in the blank subtracted chromatogram), at high elution temperature, and the minimum or flat region of detector signal on the high temperature side of the soluble fraction (SF).

Figure 4:
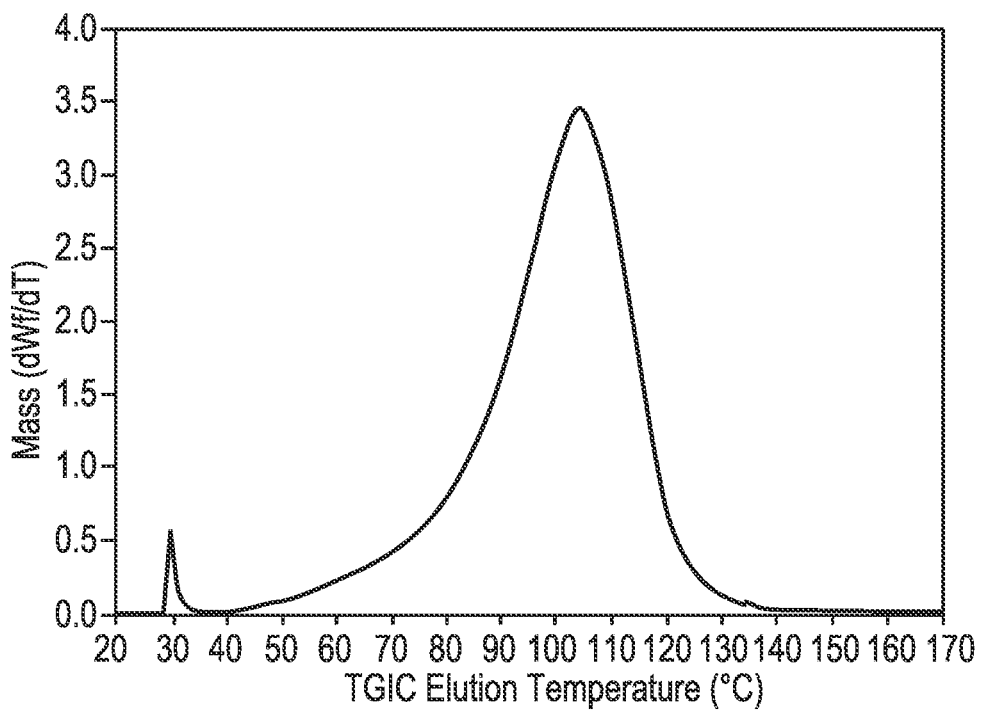
FIG. 4 is an example chromatogram for the determination of an HCC value for a comparative copolymer.

The upper temperature integration limit was established, based on the visible difference, when the peak falls to the flat baseline region (roughly a zero value in the blank subtracted chromatogram). The lower temperature integration limit was established, based on the intersection point of baseline with the chromatogram, including the soluble fraction. The "High Comonomer Content (HCC)" is defined as the weight percentage of the material eluting at a temperature ≤65.0° C. The HCC was calculated by integrating the IR measurement channel (IR chromatogram), at temperatures less than, and including, 65.0° C., and dividing this value by the total integration of the IR measurement channel. FIG. 4 is an example chromatogram for the determination of the HCC value for a comparative copolymer.

High Comonomer Content (HCC) Method 2

The HT-TGIC (or TGIC) measurement uses a commercial Crystallization Elution Fractionation instrument (CEF) (Polymer Char, Spain) to perform high temperature thermal gradient interaction chromatography (HT-TGIC, or TGIC) measurement (Cong, et al., Macromolecules, 2011, 44 (8), 3062-3072). The Method #2 used CEF instrument that was equipped with an IR-4 detector (such as that sold commercially from PolymerChar, Spain), and a low porosity graphite as the substrate or stationary phase. The low porosity graphite was packed into a column with a dimension 0.46 (ID)×25 (length) cm. An "8 cm×0.48 cm (3/16 inch ID)" stainless steel column packed with "27 micron diameter" glass beads (Catalog #GL01918/20-27 um, MO-SCI Specialty Products, LLC, Rolla, Mo., USA), was installed in front of the IR detector, in the top oven of the CEF instrument. PolymerChar instrument control software was used. The experimental parameters for the PolymerChar instrument control software were: top oven/transfer line/needle temperature at 150° C., dissolution temperature at 160° C., dissolution stirring setting of 2, pump stabilization time of 15 seconds, a pump flow rate of cleaning column at 0.500 mL/m, pump flow rate of column loading at 0.300 ml/min, stabilization temperature at 150° C., stabilization time (pre, prior to loading of column) at 3.0 min, stabilization time (post, after loaded to column) at 1.0 min, SF (Soluble Fraction) time at 5.0 min, cooling rate of 3.00° C./min from 150° C. to 30° C. The flow rate during cooling was 0.04 mL/min, and the heating rate was 2.00° C./min, from 30° C. to 150° C., and an isothermal time at 150° C. for 10 minutes. The elution flow rate was 0.500 mL/min, and the injection loop size was 200 microliters. The flow rate during cooling process was adjusted according to the length of the graphite column, where all the polymer fractions must remain on the column at the end of cooling cycle.

Samples were prepared by the PolymerChar autosampler, at 160° C., for 60 minutes, at a concentration of 4.0 mg/ml in ODCB (defined below). Silica gel 40 (particle size 0.2~0.5 mm, catalogue number 10181-3, EMD) was dried in a vacuum oven at 160° C., for about two hours, prior to use. The 2,6-di-tert-butyl-4-methylphenol (1.6 grams, BHT, catalog number B1378-500G, Sigma-Aldrich) and the silica gel 40 (5.0 grams) were added to two liters of ortho-dichlorobenze (ODCB, 99% anhydrous grade, Sigma-Aldrich). This "ODCB containing BHT and silica gel" was referred to as "ODCB." This ODCB was sparged with dried nitrogen ($N_2$) for one hour prior to use.

The TGIC data was processed on a PolymerChar (Spain) "GPC One" software platform. The temperature calibration was performed with a mixture of about 4 to 6 mg EICOSANE, 14.0 mg of isotactic homopolymer polypropylene iPP (polydispersity of 3.6 to 4.0, and molecular weight Mw reported as polyethylene equivalent of 150,000 to 190,000, and polydispersity (Mw/Mn) of 3.6 to 4.0. DSC melting temperature at 158-159° C. with the specified method below), and 14.0 mg of homopolymer polyethylene HDPE (zero comonomer content, Mw reported as polyethylene equivalent as 115,000 to 125,000, and polydispersity of 2.5 to 2.8), in a 10 mL vial filled with 7.0 mL of ODCB. The dissolution time was two hours at 160° C.

Figure 5:
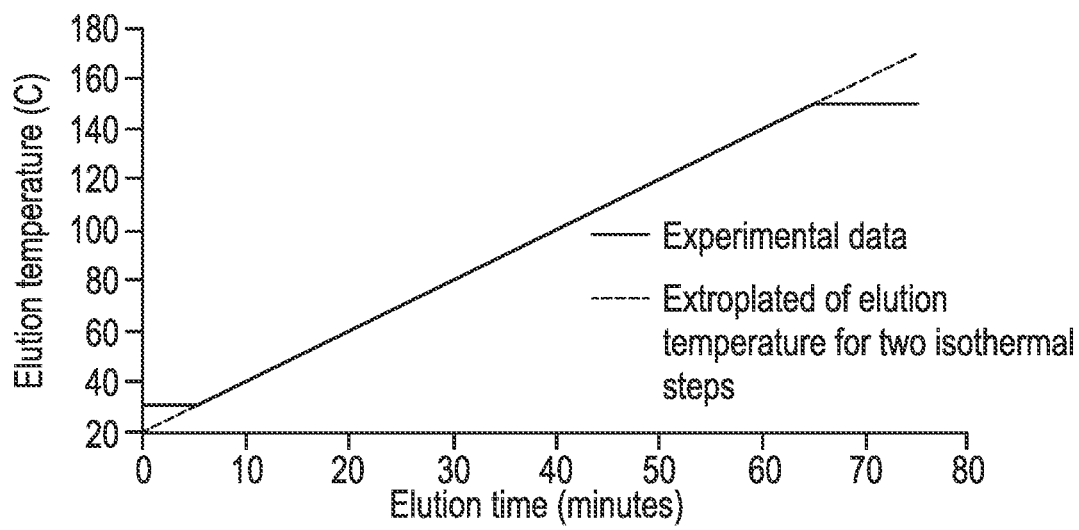
FIG. 5 depicts the extrapolation of the elution temperature for TGIC temperature calibration.

The calibration process (30° C. to 150° C. for EICOSANE elution and HDPE elution) consists of the following steps:

Extrapolate eluting temperature for each of the isothermal steps during elution according to heating rate (demonstrated in FIG. 5 (extrapolation of the elution temperature for TGIC temperature calibration)).

Calculate the delay volume. Shift the temperature (x-axis) corresponding to the IR measurement channel chromatogram (y-axis), so that the EICOSANE peak maximum (y-axis) is coincident with elution temperature at 30.0° C. The delay volume is calculated from the temperature difference (30° C.—the actual elution temperature of EICOSANE peak maximum) divided by the heating rate of the method, and then multiplied by the elution flow rate.

Adjust each recorded elution temperature with this same delay volume adjustment.

Linearly scale the heating rate, such that the observed HDPE reference has an elution peak maximum temperature of 150.0° C., while the EICOSANE elution peak maximum temperature remains at 30.0° C.

The peak temperature of the polypropylene will be observed within the range of 119.3-120.2° C., which is a validation of the calibration method.

The data processing for polymer samples of TGIC is described below.

A solvent blank (pure solvent injection) was run at the same experimental conditions as the polymer samples. Data processing for polymer samples includes: subtraction of the solvent blank for each detector channel, temperature extrapolation as described in the calibration process, compensation of temperature with the delay volume determined from the calibration process, and adjustment in elution temperature axis to the 30° C. and 150° C. range, as calculated from the heating rate of the calibration.

The chromatogram (measurement channel of IR-4 detector) was integrated with PolymerChar "GPC One" software. A straight baseline was drawn from the visible difference, when the peak falls to a flat baseline (roughly a zero value in the blank subtracted chromatogram) at high elution temperature and the minimum or flat region of detector signal on the low temperature side of the soluble fraction (SF).

The upper temperature integration limit was established based on the visible difference when the peak falls to the flat baseline region (roughly a zero value in the blank subtracted chromatogram). The lower temperature integration limit is established based on the intersection point of baseline with the chromatogram including the soluble fraction.

HCC of the Method 2 is defined as the polymer fraction eluting between the lower temperature integration limit to 59.0° C.—see Equation H2 below.

$$HCC \% \text{ of the method } \#2 = 100 \times \frac{\int_{lower temperature\ intergation\ limit}^{59.0} (dWi/dT) dT}{\int_{lower temperature\ intergation\ limit}^{Upper temperature\ intergation\ limit} \left(\frac{dWi}{dT}\right) dT} \quad \text{(Eqn. H2)}$$

Figure 6:
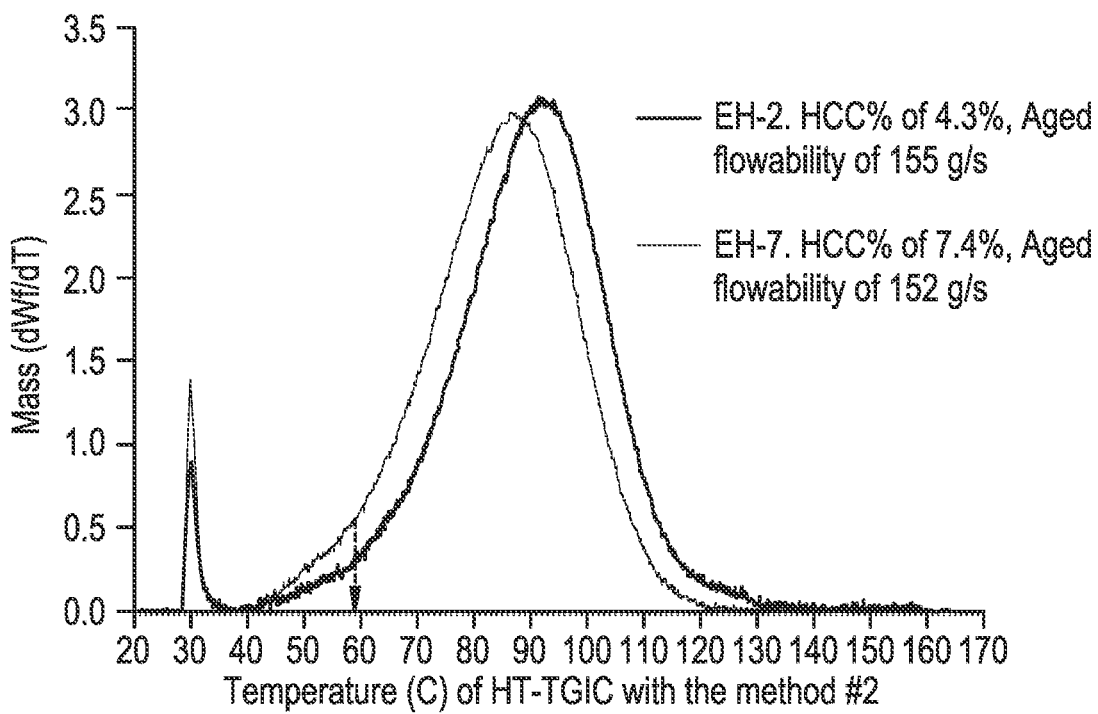
FIG. 6 shows HT-TGIC chromatograms for polymers EH-2 and EH-7 (HCC Method #2).

For Method 2, the HCC value is determined from the area from 28.2° C. to 59.0° C., divided by the total area (28.2° C. to 160° C.), and this quotient multiplied by 100. See also FIG. 6, which shows HT-TGIC chromatograms for polymers EH-2 and EH-7, each obtained by the HCC Method #2. The HCC values obtain using the methods (1 and 2) described herein provide for the same values, within a standard deviation ±0.1 or less.

Column Preparation—Low Porosity Stationary Phase—HCC Method 2

A low porosity graphite, spherical-like particles, with a D50 of 20-24 microns, the D10 was larger than 12 microns, and the D90 less than 42 microns. The porosity characteristics are listed in Table A. The low porosity graphite was packed into a column of 0.46 (ID)×25 (length) cm.

TABLE A

Pore size distribution and surface area characterization*

| | Total Pore Area (m$^2$/g) | Bulk Density (g/mL) | Apparent Skeletal Density (g/mL) | Porosity (%)* | BET Surface Area (m2/g) |
|---|---|---|---|---|---|
| low porosity stationary phase | 3.4 | 0.876 | 1.00 | 12.2 | 5.8 |

*Pores with a diameter of 0.003 to 1 microns were used.

Hardware for Packing Column for Method #2—HT-TGIC

Stainless steel column, frit, end fitting of the column were obtained from Agilent Technologies (previously PolymerLab Inc.). An Agilent Model 1100 Liquid Chromatography Pump was used for the slurry packing method. TCB (1,2,4-trichloro-benzene) was the slurry medium. A slurry packing reservoir was constructed of "0.46 cm" internal diameter stainless steel tubing with Valco end fittings. The reservoir was 150 mm in length. A standard ¼" outside diameter tube union was used to connect the packing reservoir to the empty analytical column.

Methodologies for Packing Columns

Packed columns exhibit good mass transfer properties, including low back pressure at standard operating conditions of flow and temperature, low sensitivity to shock from abruptly changing conditions, and lack of channels and void spaces.

Packed columns that have sufficient internal liquid volume to permit the studies of the effect of dynamic cooling on component resolution. The dynamic cooling is a process of using a slow flow during the cooling process of CEF and HT-TGIC (Monrabal et al, Macromol. Symp. 257, 71-79 (2007), and Cong, et al., Macromolecules, 11, 44 (8), 3062)).

The methodologies of preparing low porosity column(s) first uses (1) dry packing by using the tap-and-fill method, in which the added material is settled by tapping the column, or using an electric vibrating tool, followed by (2) slurry packing method, which uses a suspension or slurry of the substrate where the slurry is pumped into the column under flowing conditions (Striegel, Yau, et al., Modern Size Exclusion Liquid Chromatography, Wiley, the 2$^{nd}$ edition, Chapter 6).

For the simple tap-and-fill method, the column is suspended vertically. Substrate is added in small increments through a funnel, while the column being tapped or vibrated to settle the substrate. When the substrate is level with the end of the column, the end fitting is added, and the column is tightened. It is a standard practice to condition the columns prior to use, and to inspect the bed for settling or voids. If voids are found, more packing is added to level the end of the column.

For the slurry packing method, the substrate materials were dry added to the empty column. The reservoir and column, with end fitting, is then assembled, and connected to the Agilent pump. TCB is pumped upward, at a flow of 1 mL/min, through the reservoir, until air is displaced from the column. The flow is momentarily stopped, the column and reservoir is then inverted to a down-flow position. TCB is pumped at 3-5 mL/min through the column for at least twenty minutes, or until the system pressure reaches 2500 PSIG. The column is disconnected from the packing reservoir, and any excess packing at the end of the column is removed with a flat blade scraper to provide an even level with the end of the tubing. The end fitting is tightened into place, and the column is ready for conditioning.

Column Conditioning

The newly packed column is installed in the HT-TGIC instrument, and flow is established at 0.1 mL/min at room temperature. Depending on the material and how efficiently it is packed, the back pressure at this point is usually 2-10 Bar. The flow is increased in steps of 0.1 mL/min, allowing the pressure to stabilize between each increase, up to either 0.7 or 1.0 mL/min. The column temperature is increased to 60° C., and then a linear temperature ramp is used to heat the column, under flow, to 140° C. at 10° C./min. This final temperature is held for 20 minutes, and then the column is cooled at 10° C./min to 100° C., and pronounced ready for testing.

Mercury Porosimetry for Pore Size Distribution and Porosity

Pore size distribution was obtained by mercury porosimetry. The mercury porosimetry analysis was performed on a Micromeritics Autopore IV 9520, available from Micromeritics. The samples were dried at 110° C., for 2 hours, and then mechanically out-gassed, while under vacuum, prior to analysis, to remove any physically adsorbed species (i.e., moisture) from the surface of the sample.

Test conditions included a Hg fill pressure of 0.50 psia, Hg contact angle of 130°, Hg surface tension of 485 dyn/cm, Hg density 13.53 g/mL, 30 minutes of evacuation time, large bore penetrometer (powder type: 1.131 stem volume) with 5-cc bulb, 30 seconds of equilibration time, 92-point pressure table (75 intrusion plus 17 extrusion pressure points), and mechanical evacuation <50-μm Hg. The low to high pressure cross over point was collected at approximately 39 psia (4.6 um). The pressure table used was generated to allow an even incremental distribution of pressures, on a log scale, from 0.5 to 60,000 psia, and was used for detecting pore size from 0.003-400-μm diameter. Mercury was forced into smaller and smaller pores as pressure was increased incrementally, from a vacuum, to a maximum of nearly 60,000 psia. To verify that the instrument was working properly, a Silica-Alumina reference material (Micromeritics lot A-501-46) was analyzed. The reported median pore diameter (volume) of the reference sample was 0.0072±0.0005 μm. The Autopore reported the median pore diameter (volume) of the reference material as 0.0071-μm. Porosity was calculated by excluding the inter particle intrusion using the data processing software equipped with Micromeritics Autopore IV 9520. Skeletal density was computed after the volume of all pores larger than about 0.003 μm has been excluded from the volume presumed occupied by the material.

Nitrogen Adsorption/Desorption (B.E.T.)

Nitrogen adsorption/desorption analysis was performed on a Micromeritics Accelerated Surface Area & Porosimetry instrument (ASAP 2405). The samples were out-gassed at 200° C. for approximately 24 hours, while under vacuum, prior to analysis. Approximately 0.5 gram of the "as-received" sample was used for the analysis. Typically, B.E.T. surface areas are achieved with a precision of <3% RSD (relative standard deviation). The instrument employs a static (volumetric) method of dosing samples, and measures the quantity of gas (nitrogen) that can be physically adsorbed on a solid at liquid nitrogen temperature. For the multi-point B.E.T. measurement, the volume of nitrogen uptake was measured at pre-selected relative pressure points, at constant temperature. The relative pressure was the ratio of the applied nitrogen pressure to the vapor pressure of nitrogen at the analysis temperature of 77 K. Pore sizes from about 17 to 3,000 Angstroms diameter are detected by this method.

Test conditions for the nitrogen adsorption/desorption isotherms include a 15 second equilibration interval, a 97-point pressure table (40 adsorption points, 40 desorption points, multi-point B.E.T. surface area, 20 micropore points, and 1-point total pore volume), a 5%/5 mmHg P/Po tolerance, and a 120 min Po interval. BET calculation was performed using the data processing software equipped from Micromeritics Accelerated Surface Area & Porosimetry instrument (ASAP 2405).

Particle Size Distribution (D50, D10, D90)

The laser diffraction particle size analyzer utilizes the Fraunhofer theory of light scattering. Laser diffraction based, particle size analysis relies on the fact that particles passing through a laser beam scatter light at an angle where the scattered light intensity is directly related to the size of particle.

A Beckman Coulter LS13 320 laser diffraction instrument, equipped with a Universal Liquid Module, was used to determine the particle size distribution of the base particles. A "0.25 gram" of sample was dispersed in 40 ml of clean, and bubble free, deionized water (DI). The instrument performed a routine background check, before the actual run, and subtracted any particles that may have been present before loading of the particles to be measured. The mixture was stirred with a magnetic stirrer, to uniformly disperse the particles at room temperature. One drop of "Micro 90 surfactant (manufacture)" was added to the mixture of the base particles. Drops of the dilute dispersion were spiked into the liquid module port of the analyzer, until 8% obscuration was achieved. The instrument was then set to run mode. Each run was 60 seconds. Three consecutive runs were done, one minute apart, to assure the obscuration remained constant, and the particles were not dissolving or agglomerating. An equivalent spherical diameter was used to characterize the size distribution of the particles. Particle size measurements were performed over the size range of 0.4 to 2000 microns. Particles outside the measurement range were not included in the reported statistics by the software. Data acquisition and computation of average particle size were done with the software provided by Beckman Coulter LS 13 320 instrument. The D10, D50 and D90 are defined as the diameter of cumulative distribution curve (volume based) at 10% point, 50% point and 90% point, respectively. The instrument was checked with latex standards for a normal operation with Beckman Coulter's control samples.

Conventional GPC

The high temperature gel permeation chromatography (HT GPC) systems consisted of either a PL-220 model from Agilent, or a GPC IR model from PolymerChar. The column and carousel compartments were operated at 140° C. Three Polymer Laboratories "10-μm Mixed-B columns" were used with a solvent of 1,2,4-trichlorobenzene. The samples were prepared at a concentration of "0.1 g of polymer in 50 mL of solvent." The solvent used to prepare the samples contains "200 ppm of the antioxidant BHT." Samples were prepared by agitating/shaking lightly for four hours at 160° C. The injection volume was 200 microliters, and the flow rate was 1.0 mL/min. Calibration of the GPC column set was performed with twenty one, narrow molecular weight distribution polystyrene standards, purchased from Agilent. The polystyrene standard peak molecular weights were converted to polyethylene molecular weights using Equation 1 below:

$$Mpolyethylene = A(Mpolystyrene)^B \quad \text{(Eqn. 1)},$$

where M is the molecular weight, A has a value of 0.4316, and B is equal to 1.0 (Reference: T. Williams and I. M. Ward, J. Polym. Sci., Polym. Let, 6, 621 (1968)). A third order polynomial was determined to build the logarithmic molecular weight calibration as a function of elution volume. Polyethylene equivalent molecular weight calculations were performed using "GPC One" software (PolymerChar). Number average and weight average molecular weights were calculated according to the following Equation 2 and Equation 3:

$$M_n = \frac{\sum_i Wf_i}{\sum_i Wf_i / M_i}, \quad \text{(Eqn. 2)}$$

$$M_w = \frac{\sum_i Wf_i * M_i}{\sum_i Wf_i}. \quad \text{(Eqn. 3)}$$

In Equations 2 and 3, the $Wf_i$ is the weight fraction of the ith component, and the Mi is the molecular weight of the ith component. The precision of the weight-average molecular weight (Mw) is ≤2.6%. Replicate analysis can be made in order to achieve this precision.

Aged Flowability Test Method

To quantify pellet-to-pellet stickiness, a funnel test was developed. This test is based on the basic concept that increased interparticle interaction (stickiness) will reduce discharge rate out of a steep funnel. The change in discharge rate can be related to change in surface properties (i.e., stickiness) of a polymer pellet.

Figure 3:
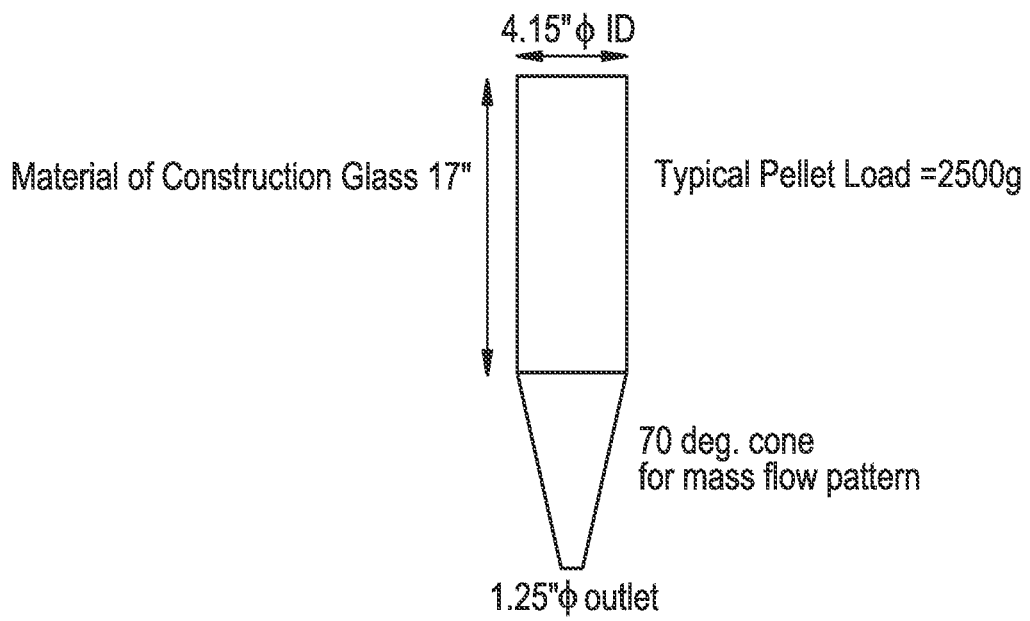
FIG. 3 depicts the test funnel for the pellet flowability study.

The test apparatus (see FIG. 3) consists of a steep glass funnel attached to a cylinder (4.15 inch diameter). The cylindrical section provides necessary capacity, so that substantial amount of pellets can be tested, and to avoid the problem of differentiating small values of discharge times. The test was repeated five times for statistical purpose.

The discharge rate of pellets was measured on "as received" sample, and after conditioning pellets at a pre-defined storage temperature, for pre-determined duration. Pellets were "thermally treated" or "aged" at 42° C. for three weeks. The conditioned pellets were cooled overnight, at 21° C., to achieve constant temperature.

As discussed above, polymer (about 2500 g; pellet form; 30±10 pellets per gram) was thermally treated in an oven, at 42° C. for three weeks. The polymer was removed from the oven, and allowed to cool for 12 hours at 21° C. The funnel was charged with the polymer pellets (2500 g), and the time for the complete discharge of the pellets from the funnel was measured, and the discharge rate was calculated using the equation below.

Discharge Rate or Flowability(g/s)=Amount of Pellets In Funnel(g)/Time Taken To Discharge(s)

The flowability is an indicator of pellet stickiness. It has been determined that flowability of 120 g/s is the minimum flow rate needed to achieve acceptable handling characteristics of the polymer pellets. However, even higher rates are preferred for better handling of the polymer pellets. Higher pellet flowability values correspond to more free-flowing and less sticky pellets. A polymer may be stabilized with ≤5000 ppm, or less of one or more stabilizer(s) (for example, IRGONOX 1010, IRGANOX 1076, and IRGAFOS 168); however such low amounts of stabilizer(s) will not affect the flowability results of the polymer.

Heat Stress

The heat stress resistance (Heat Stress) was measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction), having dimensions of 2 inches (50.8 mm)×3 3/16 in (81 mm), and 2 in (50.8 mm)×5 1/2 in (139.7 mm), were bonded by applying 0.00014 lb/in of the composition (0.000 28 lbs) in the middle of the shorter coupon, with an Olinger Bond Tester. The composition was applied perpendicular to the flutes in the center of the shorter coupon, and the coupons were bonded, such that the composition was 3/4 in (19 mm) from one end of the long coupon. Six replicates were made for each adhesive formulation. Samples were loaded into the sample holder, with the short coupon end aligned with the edge of the sample holder. The samples were held in place with the wide plate secured by wing-nuts. A "200 g weight" was placed 3.94 in (100 mm) from the bond. The weight was secured by placing the peg on the weight into a hole made in the long coupon. The sample holder was then placed into a convection oven, at a test temperature, for 24 hours. If at least 4 of 6 of the bonds do not fail, then the sample is considered to have passed heat resistance testing, at the test temperature. The oven temperature was varied, until the maximum passing heat stress resistance was determined. All new bonded coupon samples were used for each test temperature. Results are reported as Heat Stress Temperature (° C.).

Peel Adhesion Failure Temperature (PAFT) and Shear Adhesion Failure Temperature (SAFT)

Samples for testing were prepared using two sheets of "40 pound" Kraft paper, each sheet of 6 in×12 in (152 mm×305 mm) dimensions. On the bottom sheet, lengthwise and centered, a 1 inch (25 mm) gap is created, sandwiching parchment paper on either side of 1" center gap, in between the 2 layers of Kraft paper. The adhesive formulation was heated to 177° C. (350° F.), approximately 7 grams of the molten adhesive was dispensed at the top center of the bottom substrate. Then, before the adhesive could unduly thicken, two glass rods (each 0.25" diameter), one rod, wrapped with 4.5" of pressure sensitive tape, like masking tape spaced 2" apart, riding immediately upon the bottom substrate, followed by the second rod, riding on the top substrate, and (between the two rods) the second sheet of paper, and the rods were slid down the length of the sheets. This was done, such that the first rod evenly spread the adhesive in the gap, and the second rod evenly compress the second sheet over the top of the gap. Thus, a single "1 inch (25.4 mm) wide" strip of an adhesive bond was created between the two paper sheets. The sheets, so bonded, were cut crosswise into strips of a width of 1 inch (25.4 mm) and a length of 3 inches (76.2 mm), each strip having a 1 in×1 in (25 mm×25 mm) adhesive sample bond in the center. All test strips were conditioned at room temperature, 23° C. and 50% relative humidity, for 24 hours prior to testing. The strips were then be used in the PAFT and SAFT testing.

Peel adhesion failure temperature (PAFT) and shear adhesion failure temperature (SAFT) were determined in accordance to ASTM standard test D-4498. A programmable oven was used. The temperature of the oven started at 30° C., and increased 0.5° C./min, until the adhesive bonds failed and the maximum temperature at which the bonds did not fail was recorded.

For the PAFT test, a "100 gram weight" was attached to one end of the one Kraft paper substrate. The same end of the other Kraft paper was fixed to a stationary sample holder. This setup resembles a 180-degree peel action. Three test strips were tested, and the average temperature reported.

For the SAFT test, a "500 gram weight" was attached to one end of the Kraft paper substrate. The opposite end of the other Kraft paper was fixed to a stationary sample holder. This setup resembles a 180-degree shear action. Three test strips were tested, and the average temperature reported.

Percent Fiber Tear (FT)

Percent Fiber Tear (FT) of each adhesive formulation using Inland corrugated cardboard was determined according to a standardized method. A bead of the adhesive was applied in the center of a cardboard coupon (5 cm×6 cm), using an Olinger Bond Tester, a mechanical testing device used to form and tear test bonds (bead place in about a 0.75 inch strand at 0.00014 lb/in). A second cardboard coupon (2.5 cm×6.5 cm) was quickly placed on top of the adhesive. Light finger pressure, for about three seconds, was applied to hold the bond in place. Test samples were conditioned for at least four hours, at room temperature and 50% relative humidity. Next, the samples were conditioned at the test temperatures for five hours to 24 hours. For each test temperature, five test samples were each pulled apart by hand, and the amount (%) of fiber tear within each bond area was determined. The average percentage of fiber tear was recorded.

Open Time and Set Time

Set Time and Open Time properties were determined using an Olinger Bond Tester, a mechanical testing device used to form and tear test bonds. The Olinger Bond Tester was heated to 350° C. (177° C.) to melt the adhesive formulation. The bottom substrate, 2.5 inch (63.5 mm)×2 inch (50.8 mm) corrugated board, moved on a track under an adhesive pot, which delivered a bead of adhesive approximately 1/16" (1.6 mm) to 1/8" (3.2 mm) wide, and 1" (25.4 mm) long (bond tester operated at 0.00014 lb adhesive/in). The adhesive pot pressure was increased, or decreased, in order to maintain consistent bead size. A top substrate, 2.5 inch (63.5 mm)×2 inch (50.8 mm), was applied to the bottom substrate containing the strand of adhesive, with a pressure of two bars. The Olinger was equipped with two timers, used to measure set-time and open-time potential to the nearest second.

Open Time is the longest time period between the adhesive application to one substrate, and the bonding of the second substrate, that results in at least 50% fiber-tearing for 3 samples at room temperature. For the determination of open time, a compression time was set to the time needed to achieve 100% fiber tear for 3 samples at room temperature. The "time period between the adhesive application to one substrate, and the bonding of the second substrate (t)" was initially set at 10 seconds, and increased in 10 second intervals, until less than 50% fiber tear was achieved for 1 sample at room temperature. The time, t, was decreased by 5 seconds, and % fiber tear determined. Finally, the time, t, was changed by a one second interval, to determine the maximum allowable time to achieve 50% or greater fiber tear for 3 samples at room temperature.

Set Time is the minimum compression time required to achieve a fiber-tearing bond of at least 50% fiber-tearing for 3 samples at room temperature. For this test, open time, was set at two seconds. A bond was formed as the top substrate was compressed onto the bottom substrate, at a pressure of two bars. After a preset compression time, a tear test was executed by pulling the top substrate from the bottom substrate, at room temperature. A visual assessment was then made to determine the percentage of fiber tear achieved under the preset compression time. The set time was changed in one second intervals, to determine the compression time needed to achieve 50% fiber tear for 3 samples at room temperature, and the compression time needed to achieve less than 75% fiber tear (average of five samples tested) at room temperature. The set time was recorded as the shortest time, to the nearest second, at which a min. of 50% fiber tear was obtained for 3 samples at room temperature.

13C NMR

The samples were prepared by adding approximately 2.6 g of tetrachloroethane-d2 that is 0.025 M in chromium acetylacetonate (relaxation agent) to 0.2 g sample in a 10 mm NMR tube. The samples were dissolved and homogenized by heating the tube and its contents to 150° C. The data were collected using a JEOL Eclipse 400 MHz spectrometer. The data were acquired at 130° C. using 4000 scans per data file, a 6 second pulse repetition delay, a spectral width of 25,200 Hz and a file size of 32 K data points.

Some embodiments of the present disclosure will now be described in detail in the following Examples.

EXPERIMENTAL

A. Representative Polymerization—Overview

Each polymer was produced in a continuous solution polymerization reactor. All reagents (monomer, comonomer, and hydrogen) were dissolved into a solvent carrier feed stream and injected into a circulated, single loop reactor equivalent to that described in U.S. Pat. No. 5,977,251. The solvent diluent was a saturated aliphatic hydrocarbon molecule comprised of 5 to 9 carbons (ISOPAR E).

The catalyst was (titanium, [N-(1,1-dimethylethyl)-1,1-dimethyl-1-[(1,2,3,4,5-η)-2,3,4,5-tetramethyl-2,4-cyclopentadien-1-yl]silanaminato(2-)-κN][(1,2,3,4-η)-1,3-penta-diene]-). Two co-catalysts were used: tris-(2,3,4,5,6,-pentafluorophenyl)borane (co-catalyst 1) and modified methylaluminoxane (co-catalyst 2). The two co-catalysts were mixed prior to injection, and this mixture was fed to the reactor separately from the catalyst.

The concentration of catalyst in the reactor was adjusted to control the ethylene concentration in the reactor at the target value. The concentration of each of the two co-catalyst species was adjusted to control the molar ratio of each to the catalyst species at the target value for complete activation of the catalyst complex. The alpha-olefin comonomer (1-hexene or propylene) concentration, in the feed to the reactor, was adjusted to controlled the density of the polymer, and the hydrogen concentration was adjusted to controlled the melt viscosity (or molecular weight) of the polymer. Each polymerization was run at a reaction temperature of 135° C., and at a reaction pressure greater than 35 barg. Catalyst kill (deionized water) and antioxidant (IRGANOX 1010) were diluted in solvent, and injected into the polymerizing stream, exiting the reactor, to terminate the reaction, and protect the polymer from oxidation. The reactor effluent was processed through a system that removed the polymer product from the solvent, unreacted monomer, unreactive comonomer, and hydrogen. The polymer melt was converted to solid granules using an underwater pelletizer. The polymer was stabilized with 1,000 ppm$_w$ of IRGANOX 1010.

A summary of the polymerization conditions are shown below in Tables 1a and 1b. Polymer properties are listed in Tabled 2a through 2d and Table 3 below.

TABLE 1a

EH Copolymers

| Parameter | EH1 | EH2 | EH3 | EH4 | EH5 | EH6 | EH7 |
|---|---|---|---|---|---|---|---|
| Reaction Temperature (deg C.) | 135 | 135 | 135 | 135 | 135 | 135 | 135 |
| Reaction Pressure (Barg) | 50 | 50 | 50 | 50 | 50 | 50 | 50 |
| Ethylene Concentration in the Reactor (kg/m$^3$) | 13.4 | 12.9 | 13.0 | 15.8 | 8.6 | 15.8 | 15.7 |
| 1-Hexene Concentration in the Reactor (kg/m$^3$) | 60.3 | 59.9 | 59.3 | 70.3 | 47.2 | 70.1 | 70.1 |
| Polymer Concentration in the Reactor (wt %) | 38.5 | 39.6 | 40.8 | 38.2 | 22.8 | 38.2 | 38.2 |
| Hydrogen/Production Ratio (g H2/tonne of polymer) | 197 | 180 | 176 | 235 | 221 | 241 | 241 |
| Co-catalyst-1/Catalyst Molar Ratio | 2.7 | 2.8 | 3.2 | 3.5 | 3.4 | 3.5 | 3.5 |
| Co-catalyst-2/Catalyst Molar Ratio | 1.9 | 2.0 | 2.3 | 2.5 | 2.5 | 2.5 | 2.5 |

TABLE 1b

EP Copolymers

| Parameter | EP1 | EP2 | EP3 |
|---|---|---|---|
| Reaction Temperature (deg C.) | 135 | 135 | 135 |
| Reaction Pressure (Barg) | 36 | 36 | 36 |
| Ethylene Concentration in the Reactor (kg/m3) | 15.7 | 15.1 | 9.0 |
| Propylene Concentration in the Reactor (kg/m3) | 28.2 | 26.2 | 20.7 |
| Polymer Concentration in the Reactor (wt %) | 22.1 | 22.3 | 33.4 |
| Hydrogen/Production Ratio (g H2/tonne of polymer) | 248 | 298 | 215 |
| Co-catalyst-1/Catalyst Molar Ratio | 4.0 | 3.9 | 3.0 |
| Co-catalyst-2/Catalyst Molar Ratio | 6.0 | 5.9 | 1.7 |

TABLE 2a

EH Copolymers

| EX. | Polymer Density g/cc | Polymer Viscosity cP @ 177° C. | HCC* wt % | Aged Flowability** g/s |
|---|---|---|---|---|
| EH1 | 0.873 | 11,278 | 5.8 | 161** |
| EH2 | 0.875 | 14,157 | 4.3 | 155 |
| EH3 | 0.874 | 8,758 | 6.8 | 147** |
| EH4 | 0.870 | 6,919 | 9.1 | 169** |
| EH5 | 0.871 | 6,659 | 7.1 | 153 |
| EH6 | 0.870 | 6,919 | 7.5 | 170** |
| EH7 | 0.870 | 7,288 | 7.4 | 152 |

*HCC Method 2. **Estimation based on flowability measurement made on another polymer lot from the same polymer production.

TABLE 2b

EH Copolymers

| EX. | Mn g/mole | Mw g/mole | MWD |
|---|---|---|---|
| EH1 | 8564 | 20242 | 2.36 |
| EH2 | 8972 | 21752 | 2.42 |
| EH3 | 8407 | 19130 | 2.28 |
| EH4 | 7825 | 18283 | 2.34 |
| EH5 | 7866 | 18185 | 2.31 |
| EH6 | 7702 | 18149 | 2.36 |
| EH7 | 7799 | 18675 | 2.39 |

TABLE 2c

EH Copolymers

| EX. | 1st Cool Tc1 (° C.) | 2nd Heat Delta H melt (J/g) | Crystallinity (%) | 2nd Heat Tm1 (° C.) | 2nd Heat Tm2 (° C.) |
|---|---|---|---|---|---|
| EH1 | 58.1 | 61.39 | 21.0 | 54.6 | 72.5 |
| EH2 | 63.1 | 70.30 | 24.0 | 56.0 | 75.5 |
| EH3 | 56.9 | 60.53 | 20.7 | 53.2 | 70.9 |
| EH4 | 54.2 | 60.34 | 20.6 | 48.4 | 67.5 |
| EH6 | 53.8 | 53.88 | 18.4 | 49.4 | 67.0 |

*Tm2 is the "highest peak melting temperature" defined as the as the temperature at which the highest heat flow is observed.

Figure 2:
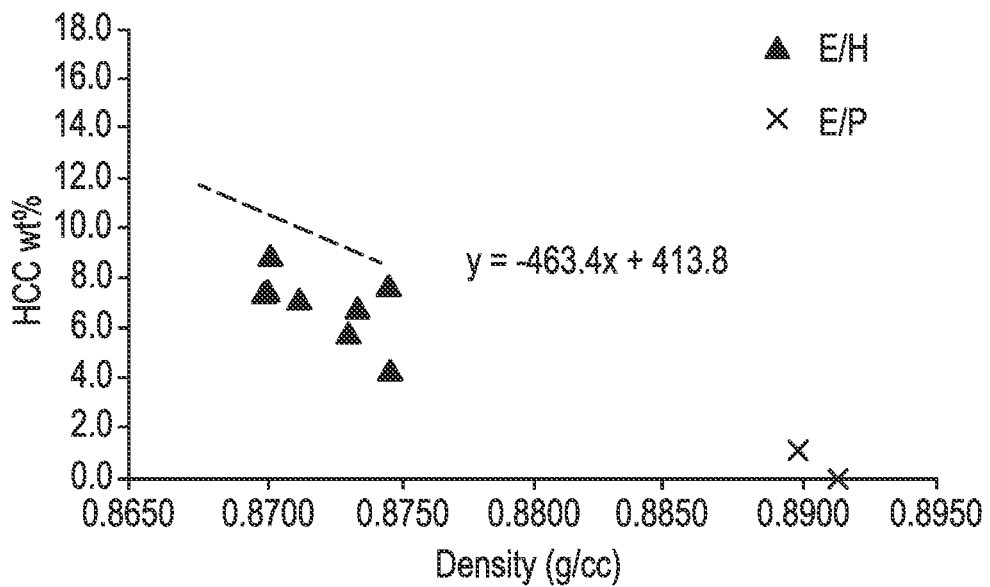
FIG. 2 depicts an "HCC versus density" plot for several inventive ethylene/C3-C6 alpha-olefin interpolymers.

As seen in Tables 2a and 3, it has been discovered that each polymer had an aged flowability greater than 130 g/s, even though some of the polymers had higher HCC values (e.g. greater than 6 wt %). See also FIGS. 1 and 2.

TABLE 2d

EH Copolymers

| EX. | wt % Ethylene* | wt % Hexene* | +/− |
|---|---|---|---|
| EH1 | 69.7 | 30.3 | 0.3 |
| EH3 | 68.9 | 31.1 | 0.2 |
| EH4 | 67.5 | 32.5 | 0.1 |
| EH6 | 67.6 | 32.4 | 0.3 |
| EH2 | 70.2 | 29.8 | 0.4 |
| EH5 | 67.4 | 32.6 | 0.4 |
| EH7 | 67.5 | 32.5 | 0.5 |

*13C NMR

TABLE 3

EP Interpolymers

| | EP1 | EP2 | EP3 |
|---|---|---|---|
| wt % Ethylene* | 81.5 | 80.6 | 79.7 |
| wt % Propylene* | 18.5 | 19.4 | 19.3 |
| wt % Hexene* | | | 1.0 |
| Density | 0.892 | 0.890 | 0.890 |

TABLE 3-continued

EP Interpolymers

|  | EP1 | EP2 | EP3 |
|---|---|---|---|
| Viscosity (177° C.) | 18326 | 7788 | 10977 |
| $T_{m1}$ (° C.) | 79.9 | 78.4 | 77.9 |
| Heat of Fusion (J/g) | 79.6 | 84.8 | 76.0 |
| Crystallinity (%) | 27.2 | 29.0 | 25.9 |
| $T_{c1}$ (° C.) | 66.2 | 66.0 | 63.5 |
| Delta H cryst. (J/g) | 85.1 | 84.4 |  |
| Mn | 8651 | 7041 | 8157 |
| Mw | 20174 | 16207 | 18420 |
| Mw/Mn | 2.3 | 2.3 | 2.3 |
| HCC*** (wt %) | 0 | 1.1 | 2.0 |
| Aged Flowability g/s | >130** | >130** | 212 |

*13C NMR.
**Estimated Aged Flowability based on the Aged Flowability value for EP3, and lower HCC values of EP1 and EP2.
***HCC Method 2.

Adhesive Preparation

Each hot melt adhesive formation was prepared via a can mixer method. A total of 50 grams of the adhesive components were weighed, and placed in an epoxy lined, 16-oz aluminum can. The can then was placed in an oven, pre-set at 350° F., for 30 minutes to melt the components. The can was then transfer to a heating block, maintained at 350° F., to mix the components. The mixing apparatus comprised a hot plate (Model SPA1025B Type 1000, manufactured by Thermolyne), a digital temperature controller (Model 89000-10, manufactured by Cole-Parmer), a mechanical stirrer (Model L1U08F LabMaster SI Mixer, manufactured by Lightnin), and the above heating block equipped with a thermocouple. The content of the aluminum can was allowed to equilibrate for approximately five minutes, before being stirred. The mixing speed was ramped slowly, from 0 to 100 rpm, and a nitrogen pad was used to fill the head space of the aluminum can. Mixing continued for approximately five minutes. The content (adhesive) of the can was then poured onto a TEFLON sheet, at ambient temperature, and cooled. Once the adhesive was at room temperature, it was stored in Ziploc bags until use. Each adhesive formulation was tested under the following test conditions: PAFT, SAFT, Heat stress Temperature, open time, set time, and Fiber Tear at various temperatures. The results are shown in Table 4 below. As seen in Table 4, each hot melt adhesive showed good adhesion performance in PAFT, SAFT, heat stress, and fiber tear, and each had a suitable open time and set time.

TABLE 4

Adhesive Formulation (wt. parts) and Results

| EX. | F1 | F2 | F3 | F4 |
|---|---|---|---|---|
| EH1 | 35 |  |  |  |
| EH4 |  | 35 |  |  |
| EH6 |  |  | 35 |  |
| EH7 |  |  |  | 35 |
| EASTOTAC H115 | 35 | 35 | 35 | 35 |
| SASOL H1 | 30 | 30 | 30 | 30 |
| IRGANOX 1010 | 0.5 | 0.5 | 0.5 | 0.5 |
| Testing |  |  |  |  |
| Viscosity @ 177 C. (cP) | 461.9 | 337.7 | 899.8 | 477.9 |
| PAFT (° C.) | 59.7 | 56.0 | 56.7 | 55.0 |
| SAFT (° C.) | 96.5 | 95.3 | 96.3 | 93.5 |
| Heat Stress Temperature (° C.) | 60 | 60 | 70 | 65 |
| FT at −40° C. (%) | 98 | 89 | 74 | 50 |
| FT at −17° C. (%) | 93 | 97 | 80 | 67 |
| FT at 0° C. (%) | 97 | 99 | 86 | 83 |
| FT at 23° C. (%) | 100 | 96 | 94 | 87 |
| FT at 60° C. (%) | 84 | 75 | 86 | 58 |
| Open Time (sec) | 14 | 15 | 15 | 11 |
| Set Time (sec) | 1 | 2 | 1 | 2 |

The invention claimed is:

1. A composition comprising an ethylene/C3-C6 alpha-olefin interpolymer, and wherein the interpolymer comprises the following properties:
   a) an HCC (high comonomer content) value, determined by HCC Method 2, that meets the following equation:

$HCC$(wt %)$\geq$−648.6[(wt %)(cc)/(g)]×(density)+569.4 (wt %);

b) an aged flowability ≥130 g/sec; and wherein the ethylene/C3-C6 alpha-olefin interpolymer has an HCC value greater than 6.0 wt % and a density less than, or equal to, 0.910 g/cc.

2. The composition of claim 1, wherein the ethylene/C3-C6 alpha-olefin interpolymer has an HCC value that meets the following equation:

$HCC$(wt %)$\geq$−648.6[(wt %)(cc)/(g)]×(density)+570.9 (wt %);

3. The composition of claim 1, wherein the interpolymer further comprises an HCC value that meets the following equation:

$HCC$(wt %)$\geq$−463.4[(wt %)(cc)/(g)]×(density)+413.8 (wt %);

4. The composition of claim 1, wherein the ethylene/C3-C6 alpha-olefin interpolymer has a melt viscosity from 2,000 cP to 50,000 cP at 350° F. (177° C.).

5. The composition of claim 1, wherein the ethylene/C3-C6 alpha-olefin interpolymer has a highest peak melting temperature less than, or equal to, 80.0° C.

6. The composition of claim 1, wherein the alpha-olefin is a C6 alpha-olefin or a C3 alpha-olefin.

7. The composition of claim 1, further comprising at least one tackifier and at least one oil.

8. An article comprising at least one component formed from the composition of claim 1.

* * * * *